United States Patent [19]

Duff et al.

[11] 3,743,791

[45] July 3, 1973

[54] CONTROL ARRANGEMENT FOR HANDS-FREE TELEPHONE OPERATION

[75] Inventors: Frank Duff, Arvada; James Louis Simon, Denver, both of Colo.

[73] Assignee: Bell Telephone Laboratories, Incorporated, Murray Hill, N.J.

[22] Filed: Dec. 30, 1971

[21] Appl. No.: 214,024

[52] U.S. Cl. .................................. 179/81 B, 179/99
[51] Int. Cl. ............................................ H04m 1/60
[58] Field of Search ...................... 179/1 HF, 37, 39, 179/81 B, 18 AD, 99

[56] References Cited

UNITED STATES PATENTS

| | | | |
|---|---|---|---|
| 3,041,411 | 6/1962 | Beatty | 179/81 B |
| 2,844,659 | 7/1958 | Shaw | 179/81 B |
| 3,197,570 | 7/1965 | Lambourn | 179/81 B |

*Primary Examiner*—Thomas W. Brown
*Attorney*—W. R. Keefauver, Henry J. Walsh et al.

[57] ABSTRACT

A key telephone intercom system is disclosed for interconnecting hands-free telephone stations and conventional key stations. The hands-free mode of operation is automatically activated on all incoming calls at equipped stations to permit the called subscriber to communicate entirely without the necessity for manual operations. The circuitry for enabling this operational mode includes a memory and ringing detection circuitry comprising a unique PNPN transistor circuit for activating the loudspeaker and microphone assembly on each call and for permitting the called station to alternate between conventional and hands-free station operation.

12 Claims, 6 Drawing Figures

Patented July 3, 1973 3,743,791

5 Sheets-Sheet 5

CONTROL ARRANGEMENT FOR HANDS-FREE TELEPHONE OPERATION

BACKGROUND OF THE INVENTION

This invention concerns "hands-free" key telephone equipment and in particular improvements in automatic activation and de-activation of associated station control circuitry.

Hands-free station equipment, often referred to as a loudspeaker telephone arrangement, enables a telephone subscriber to communicate with other stations via a special microphone and loudspeaker assembly. This assembly, generally furnished in addition to a convention station set, permits the subscriber to engage in telephonic communications without the physical constraints ordinarily associated with conventional station sets. Insofar as it is possible, manual operations associated with these systems have been minimized, and in certain cases eliminated.

A unique problem associated with hands-free operation in key telephone intercom arrangements is the maintenance and release of established call connections. Since a station functioning in a hands-free mode does not furnish conventional status (off-hook, on-hook) signals, it is necessary that either special "status" keys be furnished at each station and be manually actuated by the subscriber, or that calls be restricted in such a way that at least one subscriber on every call using a conventional station set furnishes call supervisory signals. Experience has shown that subscribers too often forget to operate special keys or tend to operate them improperly taking one or more intercom paths out of service. The loss of one or two linkage paths in an intercom system can severely affect service and in some cases shut down the system entirely. Accordingly, a use restriction imposed on hands-free equipment in intercom systems appears to be the only satisfactory alternative.

Many prior art intercom systems have implemented this restriction by permitting only the called station to use the hands-free equipment and by controlling the entire call connection with calling station supervisory signals. In those systems the restriction circuitry is under direct control of logic circuitry furnished at each station which makes an evaluation of the status of the associated station circuitry at the time the receiver is removed from its cradle. When a station user originates a call, the associated hands-free (h.f.) equipment is inhibited and remains inoperative for the duration of the call. These prior art systems have proven to be costly due to the extensive logic circuitry required, undesirable because circuit failures of the restriction circuitry resulted in the establishment of unsupervised call connections, and inefficient since each system essentially requires a tailor-made arrangement which often proved to be incompatible with connected switching systems.

SUMMARY OF THE INVENTION

It is therefore an object of this invention to furnish an improved control circuit for hands-free (h.f.) communications systems which is both capable of restricting calls involving h.f. stations and campatible with connected switching systems. Another object is to provide an h.f. station control circuit which "fails safe" in the event of a trouble condition therein and thereby voids inadvertent establishment of unsupervised connections.

These and other objects of the invention are attained in accordance with an illustrative embodiment described hereinafter in which h.f. stations are equipped to sense a ringing condition at the associated station in order to activate the hands-free mode. Advantageously, positive (inhibiting) circuit action is not required as in the prior art to prevent such mode operations because the h.f. equipment of the subject invention is customarily de-activated. Each h.f. station circuit incorporates a novel signal detector circuit which connects to the associated station ringing signal paths, or to the associated station conductors in those arrangements where ringing signals are impressed thereon, to sense a "called" station condition. The detection circuit, once activated during a call, remains activated for the call duration, acting as a memory thereafter for the called station circuitry. This memory enables the called station subscriber to alternate between the use of h.f. equipment and conventional station equipment without restriction.

The subject circuitry is compatible with connected switching systems of the prior art and therefore does not require special interfacing circuitry. Central offices as well as most PBXs ordinarily furnish ringing signals to alert a called subscriber. The combined signal detector and memory circuit of the subject arrangement is sufficiently sensitive to detect many types of interoffice ringing signals to enable h.f. operations at called stations.

DESCRIPTION OF THE DRAWING

The objects and features of this invention may be more readily understood from a reading of the following specification, appended claims, and attached drawings in which:

GENERAL DESCRIPTION

Intercom System

Figure 1:
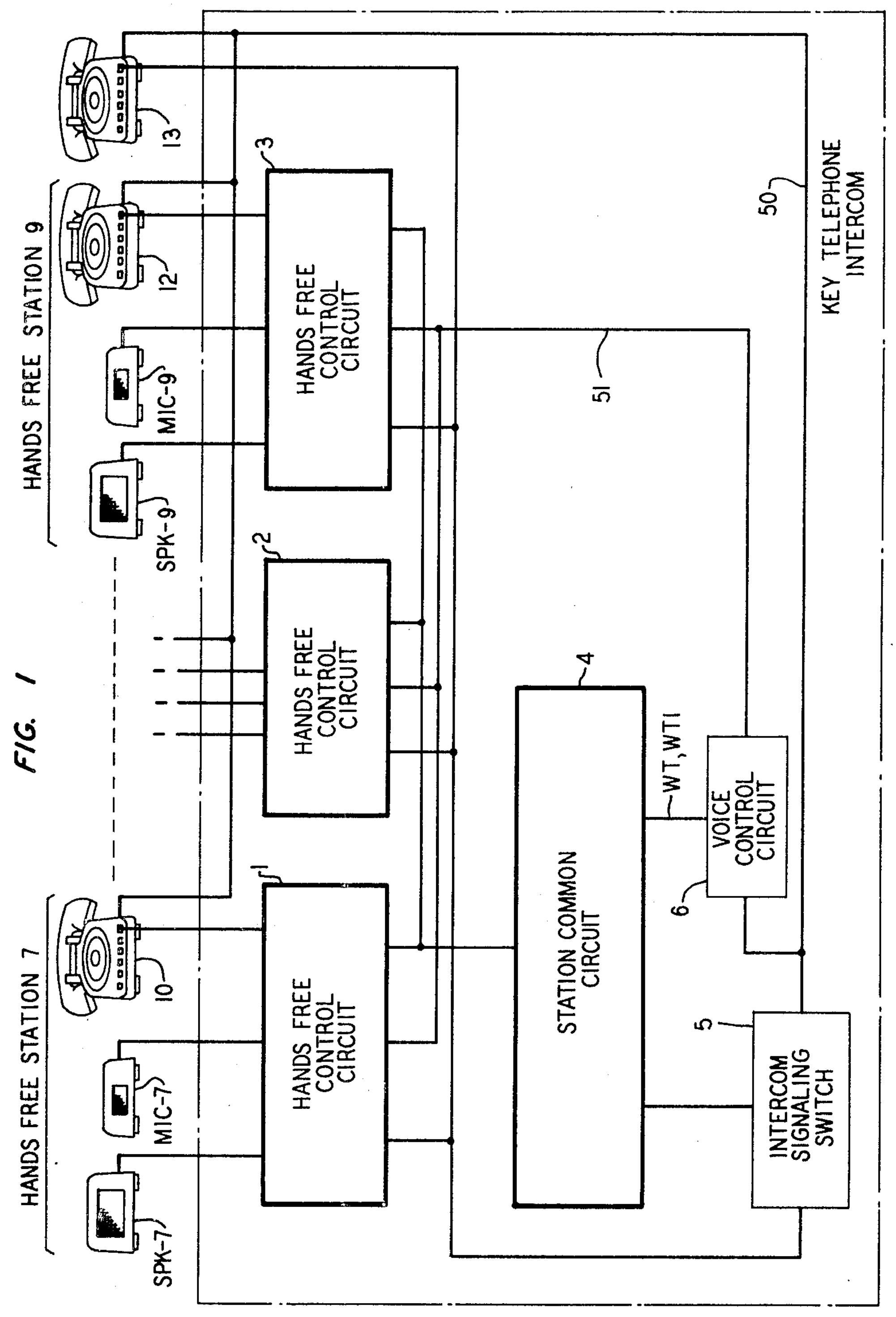
FIG. 1 sets forth a block diagram of an illustrative key telephone intercom arrangement showing connections to h.f. stations as well as to conventional stations.
Figure 2:
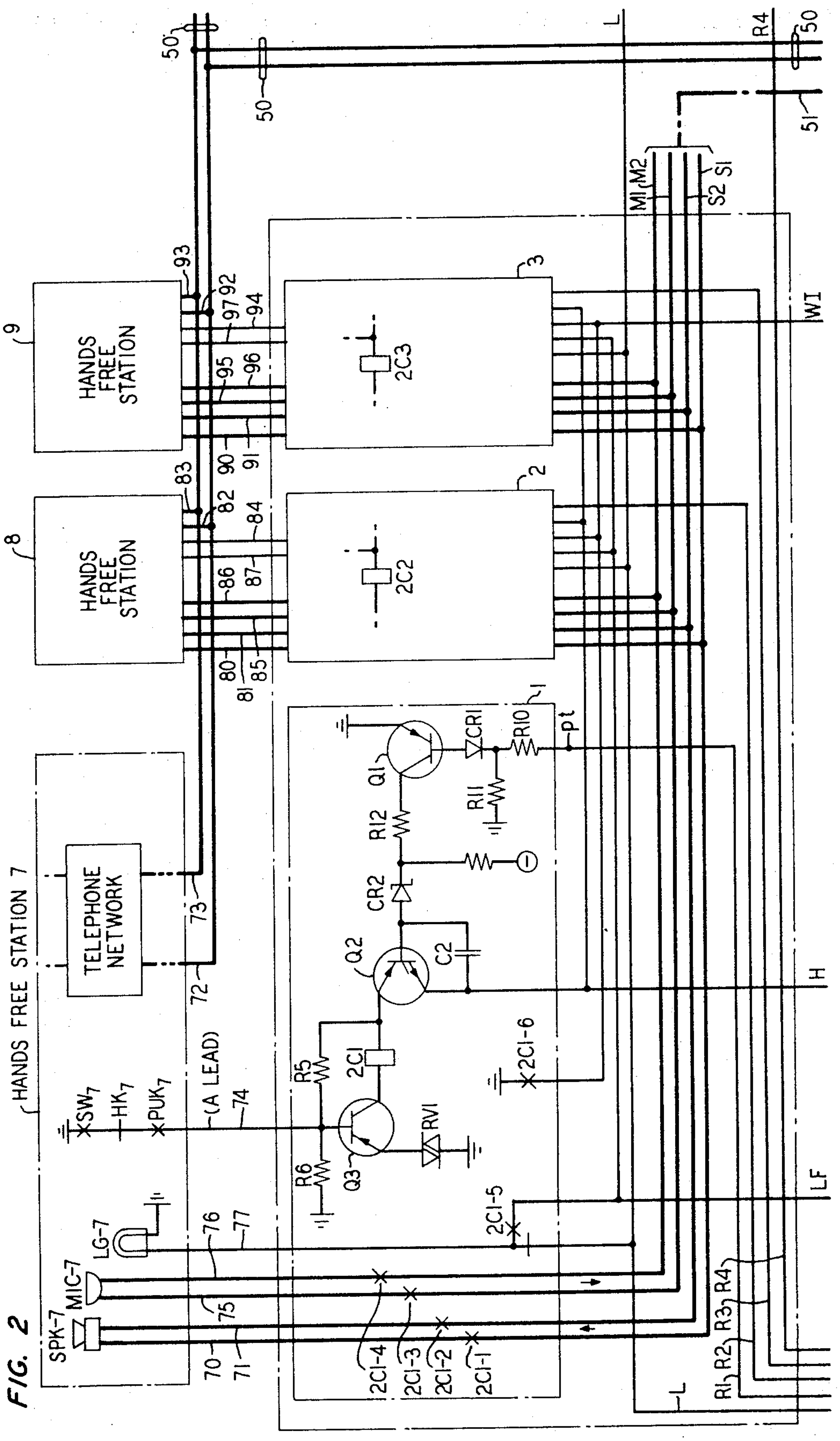
FIG. 2 discloses hands-free control circuits and the associated wiring to three key stations each of which is equipped with a microphone and loudspeaker assembly.

The invention is disclosed in a key telephone intercom arrangement shown broadly in FIG. 1, and in greater detail in FIGS. 2–5. It will however be understood that this arrangement is illustrative only, and in no way intended to limit the application of the subject h.f. control circuit. Referring now to FIG. 1, this intercom circuit includes a plurality of circuits (shown in bold outline) called hands-free control circuits 1, 2 and 3, associated with stations 7 through 9 (station 8 is shown in FIG. 2). Control circuits 1–3 contain the activating and de-activating circuitry for the h.f. station equipment (e.g., speaker SPK-7, microphone MIC-7 at station 7). Control circuits 1–3 include combined detection, memory, and control circuitry which is part of the present invention and which will be discussed in greater detail hereinafter.

Common circuit functions, such as the broadcast mode operation, also referred to as group calling in the prior art, are included in station common circuit 4 shown near the center of FIG. 1. Common circuit 4, which connects to hands-free control circuits 1–3, has facilities for enabling a plurality of station loudspeaker-microphone assemblies simultaneously during a broadcast-mode operation. Common circuit 4 also includes a lockout circuit which prevents two intercom stations from accessing intercom signaling switch 5 to prevent a simultaneous call origination.

Intercom signaling switch 5 is controllable from any intercom station, i.e., stations 7 through 9 and 13 when the system is idle, to cause ringing current to be applied to a selected intercom station. Switch 5 incorporates a dial pulse register which is reponsive to the transmitted dial pulses from a calling station for generating ringing signals at a called station. For additional details on the operation of intercom signaling circuitry in general, reference may be made to U.S. Pat. No. 3,450,845 which issued to C. E. Morse in June 17, 1969. It depicts a dial selected intercom system which may be illustratively employed in the subject arrangement. For purposes of this disclosure, it is assumed that switch 5 incorporates those circuits of the Morse patent which are identified in the patent disclosure as Ringer Selection Relay Circuit 56, Selector Control Circuit 50, and Ringing Output Contact Network 58. In addition to the foregoing, switch 5 also includes a conventional transmission batter feed circuit for furnishing talk battery on 2-wire connections.

Voice control 6 comprises a 4-wire to 2-wire transmission path hybrid and a warning tone generator. The hybrid enables conventional 2-wire station sets, such as station 13, to converse with h.f. equipped stations, which are operated over a 4-wire channel. The warning tone is connected to called h.f. stations to alert such stations to an incoming call.

Hands-Free Activation Circuitry

In the illustrative embodiment, the circuitry which essentially comprises our invention is furnished in control circuits 1-3 and in station common circuit 4. Referring now to FIG. 2, details of the activation circuit are shown for control circuit 1. Inasmuch as this circuiry is substantially reproduced in other control circuits, details of control circuits 2 and 3 are omitted to avoid obscuring the invention. At the bottom left of FIG. 2 is shown lead R1 over which ringing signals would normally be conveyed to alert station 7. The activation circuitry detects the initial cycles of ringing current on this lead and locks up memory element, PNPN transistor Q2, which thereafter activates the h.f. station equipment of the called subscriber.

The negative cycle of ringing turns on transistor Q1 which in turn furnishes base drive to transistor Q2. As will be discussed hereinafter, lead H at the bottom of FIG. 2 connects to battery when a call is in progress and therefore transistor Q2 turns on at this time and remains conductive thereafter to act as a memory that the associated station, station 7, is the called station on a particular call. It is to be noted that the circuit is positively activated by the ringing signal and the memory is held over an established path. Thus, failures of components in the control circuits, etc., result in a failure to activate or hold the circuit, advantageously resulting in a "fail safe" condition.

Relay 2C1 controls the connection of the h.f. station assembly to the intercom circuit to engage a calling station. This relay operates if the station handset is on its cradle, and releases if it is removed. Transistor Q3 operates via memory transistor Q2 if lead 74 (top of FIG. 2) is ungrounded, to operate relay 2C1. Contacts 2C1-1 to 2C1-5 shown at the left side of the figure connect the loudspeaker-microphone assembly (SPK-7, MIC-7) as well as the station lamp (LG-7) to the intercom system. Lead 74 corresponds to the so-called "a" lead as designated in prior art key telephone systems and it is grounded to render transistor Q3 nonconductive and to release relay 2C1 each time the receiver of the telephone set at station 7 is removed from its cradle. Importantly, it is to be noted that a path for maintaining the conductive state of transistor Q2 during a call is maintained either via transistor Q3 and varistor RV1 or via resistor R5 and the lead 74 to ground.

At this point it is opportune to consider the fact that the activation circuitry of control circuits 1-3 can be utilized in situations where the called station receives ringing signals over the station conductors. For those applications point *pt* shown just below transistor Q1 would be connected via a capacitor (not shown) to either one of the station conductors. Where this is concern for transmission balance, point *pt* can be connected to both conductors via isolating capacitors. In all other respects the circuit operation of circuits 1–3 is the same as described above. Due to the sensitivity which is achieved by the circuit configuration comprising transistor Q1, diode CR1, and resistors R10 and R11, a large variety of types of ringing signals can be detected, thereby making h.f. operations compatible with a majority of types of connecting offices.

Figure 3:
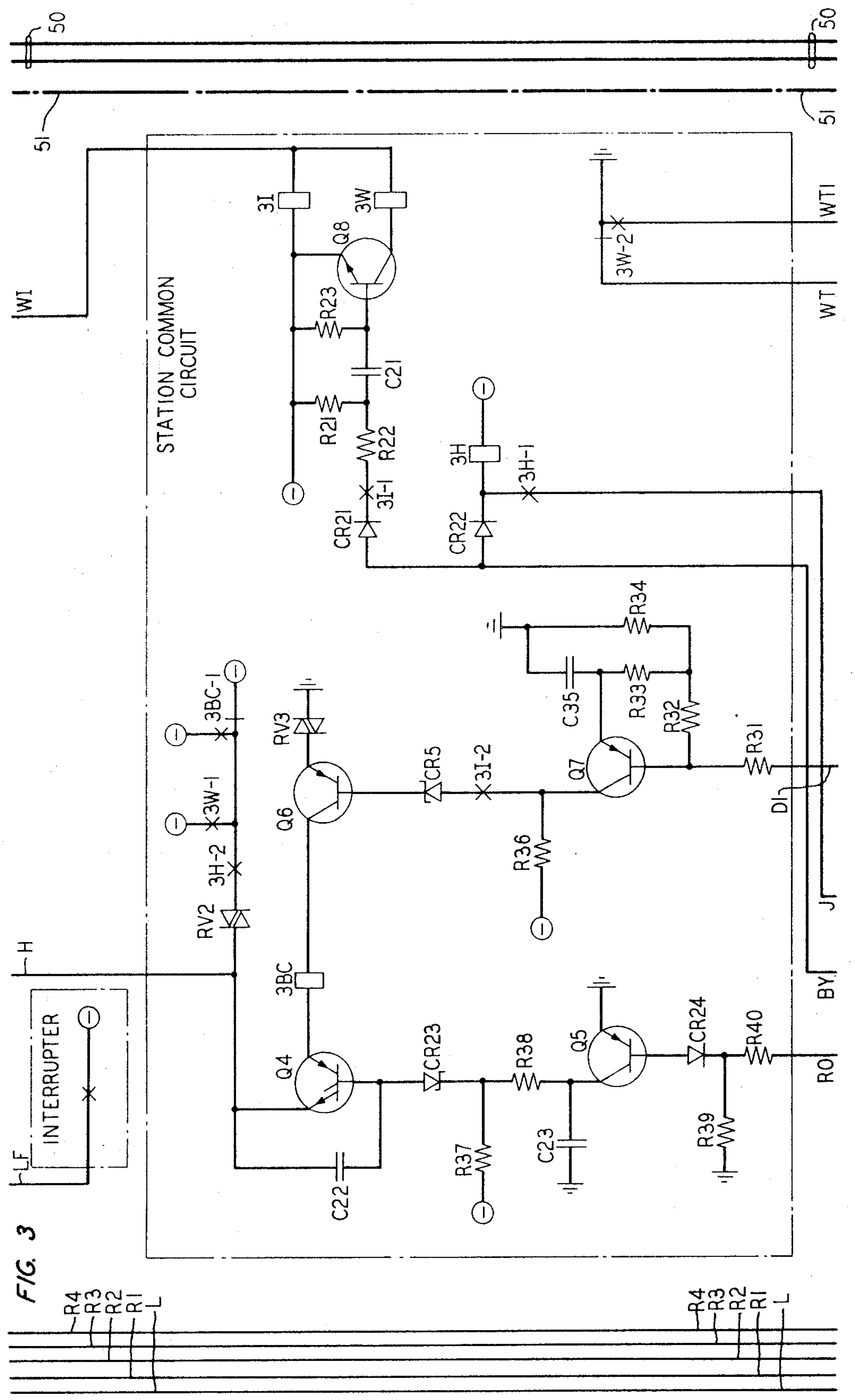
FIG. 3 shows a station common circuit which is associated with all hands-free control circuits to furnish broadcast features as well as other station services.

With references now to FIG. 3, it depicts detail circuitry of common circuit 4. The reader's attention is directed in particular to transistors Q4 and Q5 which are analogous in operation to respective transistors Q2 and Q1 previously discussed. Transistor Q4 serves as a memory element to record a broadcast mode operation on a particular call. It is maintained in a conductive state by the battery potential on lead H and is operated via a signal on lead RO (shown at the bottom of FIG. 3) which turns on transistor Q5. The similarity of this circuit operation to that of the control circuits 1–3 will be further appreciated from a reading of the detailed description which follows.

DETAILED DESCRIPTION

Call Origination

Figure 4:
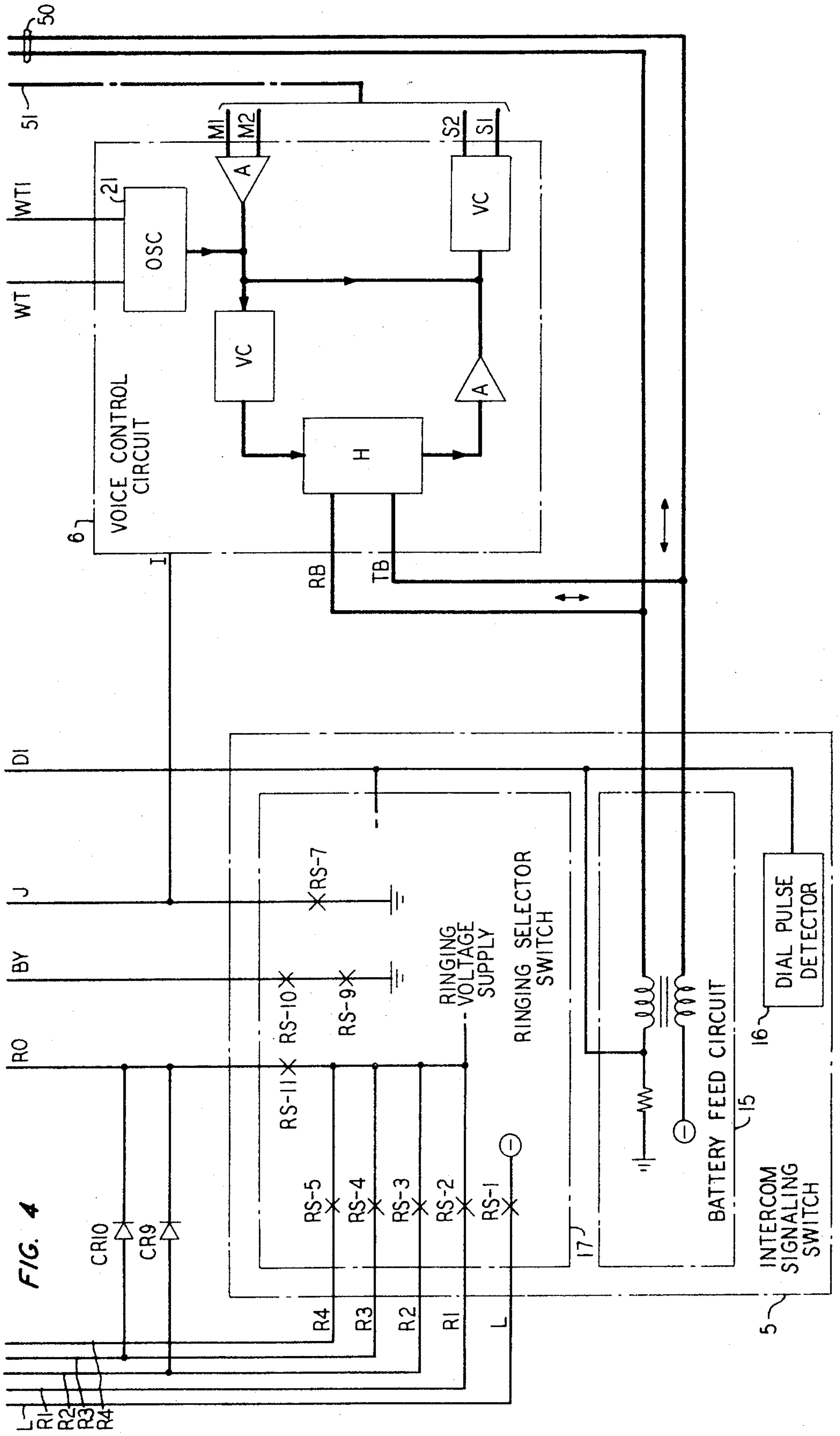
FIG. 4 shows an intercom signaling switch and a voice control circuit for two-to-four wire conversion and amplification.
Figures 5, 6:
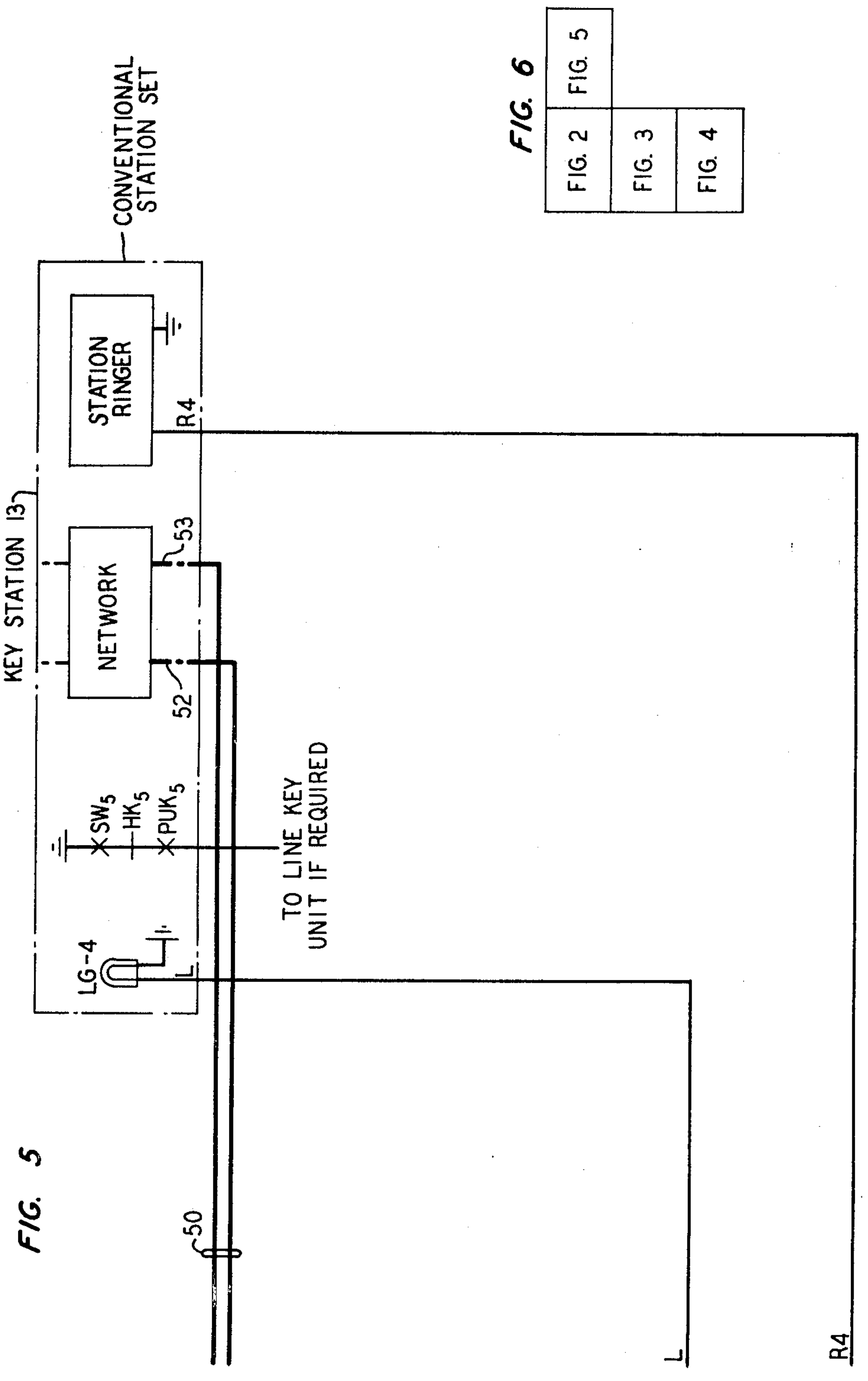
FIG. 5 shows a conventional station set and its interconnections to the intercom circuitry.
FIG. 6 indicates the manner in which FIGS. 2 through 5 can be arranged to depict a complete intercom system.

It is considered that the best mode of describing the present invention is to consider a call as it is established through the illustrative embodiment of a key telephone intercom system shown in FIGS. 2–5. Accordingly, let us assume it is desired to establish a call between conventional station set 13 to an h.f. station such as, for example, station 7. Moreover, it is assumed that the reader has organized FIGS. 2–5 in accordance with FIG. 6 preparatory to following this description. With reference initially to FIG. 5, which shows details of station 13, upon removing the receiver from its cradle and depression of a pickup key associated with the intercom system, the subscriber network at station 13 is connected directly to intercom signaling switch 5 shown in detail in FIG. 4. Lamp LG-4 at station 13 indicates the status of the intercom system. This lamp is lighted when the system is busy. Similarly, lamp LG-7 of station 7 (FIG. 2) and other station lamps are lighted to indicate the status condition. considering the connection between switch 5 and station 13 in detail, the network of station 13 is connected via leads 52 and 53 when the station pickup key as well as the station switchhook contacts (not shown) are operated. Leads 52 and 53 connect to cable 50 as shown in FIG. 5 and this cable may be traced to the lower righthand corner of FIG. 4 wherein leads 52 and 53 connect to battery feed circuit 15. Circuit 15 furnishes talking battery for the present connection and for the completed intercom connection, when established.

Turning now to FIG. 4, switch 5 incorporates a conventional dial pulse detector 16 which senses the connection of a calling station to battery feed circuit 15. In a manner which is more particularly described in the Morse patent, detector 16 causes ringing selector switch 17 to close a contact labeled herein as RS-1 for connecting lamp battery to lead L for lighting all station intercom lamps, i.e., LG-7 and LG-4. Lead L may be traced directly to lamps at stations 7, 8 and 13 via FIGS. 3, 2 and 5, respectively. In addition to the foregoing, ringing selector switch 17 applies ground to conductor J (shown at top of FIG. 4) when the contact labeled RS-7 closes to prepare a lockup path for relay 3H shown in FIG. 3. The function of relay 3H will be considered in greater detail hereinafter. It is noted that contact RS-7 remains operated as long as the calling station is off-hook and controls the release of the control circuit at the called station at the end of the call.

Returning once again to the call in progress, let it be assumed also that the illustrated intercom system contains less than a total of 10 station sets and that a single digit may be used to represent each of the station sets. Accordingly, the call originator of the present example may dial a single digit to alert any other intercom station to a pending call. In the present example, the originator desires to be connected with station 7 (upper left of FIG. 2) and therefore, let it be assumed that dial pulse detector 16 (FIG. 4) has received the single digit uniquely associated with station 7. Detector 16 forwards, in a conventional manner, a control signal to ringing selector switch 17 which in turn operates the contact labeled RS-2. This action causes the connection of ringing supply voltage to lead R1 which can be traced from FIG. 4 to FIG. 2 wherein it connects to hands-free control circuit 1.

Before considering the circuit action of hands-free control circuit 1 as a result of the applied ringing signal on lead R1, let us consider other related circuit actions taking place at this time in ringing selector switch 17. Prior to the application of ringing signal voltage of one of the station R- leads, the contacts labeled RS-9 and RS-10 of selector switch 17 are operated for grounding lead BY. This ground causes relay 3H of FIG. 3 to operate via a path including diode CR22. Operated relay 3H locks up via contact 3H-1 to a ground present on lead J which was previously discussed. An operated contact 3H-2 shown in the upper lefthand corner of FIG. 3 applies battery via a break contact of transfer contact 3BC-1 and varistor RV2 to lead H which, as will be subsequently discussed, holds the responsive memory element in the activated hands-free control circuit.

Returning now to FIG. 2 and to the application of ringing signal to hands-free control circuit 1 via lead R1, the negative half-cycle of the ringing voltage activates transistor Q1 via biasing resistor R10 and diode CR1. The collector-emitter circuit of transistor Q1 supplies base drive current to PNPN transistor Q2 which switches on. In turn, relay 2C1 is operated via the collector-emitter circuit of transistor Q3 which receives base drive current as well as collector drive current through PNPN transistor Q2. At the end of the first ring cycle when the current alternates to a positive half-cycle, or is removed depending upon the system or the type of ringing voltage supplied, the current drive to the base of transistor Q1 is removed and it turns off. It is noted, however, that transistor Q2 remains conducting so long as negative battery is applied on lead H which, it will be recalled, is controlled by operated relay 3H.

Operated contacts 2C1-1 through 2C1-4 shown at the left of FIG. 2 connect the microphone and loudspeaker assembly of station 7 directly to voice control circuit 6 of FIG. 4 to complete a transmission path to calling station 13. This path, which is a 4-wire transmission path, may be traced via leads M1, M2, S1 and S2 to cable 51 and thence to FIG. 4 where leads S1, S2, M1 and M2 connect to circuit 6. Before transmission commences called station 7 is alerted to the establishment of this connection by a warning tone. The warning tone is controlled by relay 3W (FIG. 3) which is operated momentarily by an operated contact of relay 2C1. As shown in control circuit 1 (FIG. 2), ground is connected to lead WI by operated contact 2C1-6 for operating relay 3I (FIG. 3). An operated contact of this relay, namely, 3I-1 shown at the right of center of FIG. 3, extends the ground on lead BY via a network composed of resistors R21, R22, and R23 and capacitor C21 to the base of transistor Q8. The time constant of this network causes transistor Q8 to turn on and remain conducting for approximately one second. Relay 3W operates via the collector circuit of transistor Q8 and remains operated for approximately one second to control the operation of oscillator 21 in voice control circuit 6. Oscillator 21 applies a warning tone to the loudspeaker of the called station. In particular, as shown at the lower righthand corner of FIG. 3, oscillator 21 is activated when ground is concurrently removed from lead WT and applied to lead WT1. The output of oscillator 21 connects within voice control circuit 6 to the receive as well as to the transmit channel. The latter channel may be traced via leads S1 and S2, cable 51 to FIG. 2 and thence via contacts 2C1-1 and 2C1-2 to speaker SPK-7 of station 7. The warning tone ceases with the release of relay 3W after which conversation between station 13 and station 7 may commence.

In the present example, it was assumed that the ringing voltage applied to lead R- comprises a single spurt of negative voltage. However, it will be appreciated that conventional repetitive ringing signals can be connected to hands-free control circuit 1 and that transistor Q1 will respond to each negative cycle of ringing. Transistor Q2, however, locks up after transistor Q1 responds the first time.

Transferring from a Hands-Free Mode to Conventional Mode

Advantageously, the subscriber at station 7 can disable the loudspeaker-microphone assembly and converse with the calling party at station 13 via a conventional station set without a manual operation on his part. With reference now to FIG. 2, if the called party removes the handset at station 7 from its cradle, lead 74 is grounded for turning off transistor Q3. In turn, relay 2C1 is released as the collector current of transistor Q3 is substantially cut off to disconnect the microphone and speaker channels from speaker SPK-7 and microphone MIC-7. Lead 74 is grounded when contact $SW_7$ and $PUK_7$ are operated and $HK_7$ of the station set is released. It is to be noted, however, that transistor Q2 remains conducting via resistor R5 and lead 74 to ground and thereby sustains this memory so that the called subscriber can re-enter the hands-free mode. The new transmission path for communication with the calling party from station 7 is established over leads 72 and 73 which extends from the network of station 7 and may be traced via cable 50 to FIG. 4 and thence to the 2-wire input of battery feed circuit 15. Transmission in this mode is carried on in a conventional manner.

When the subscriber desires to re-enter the hands-free mode, he may do so by simply replacing the handset of the conventional station set back onto its cradle. As a result of this action, ground on lead 74 is removed, transistor Q3 is turned on, and relay 2C1 is reoperated. It is noted that the path for turning on transistor Q3 and for reoperating relay 2C1 is via transistor Q2 which remained conducting during the conventional mode of operation. As discussed before, operated contacts 2C1-1 through 2C1-4 shown at the left of FIG. 2 reconnect speaker SPK-7 and microphone MIC-7 to voice control circuit 6 to re-establish the 4-wire transmission path to calling station 13. The previously established path from the network of station 7 to battery feed circuit 15 is opened by contact 15 is opened by contacts represented by dashed lines in the station set. Accordingly, the subscriber at station 7 may alternate between conventional operation and hands-free operation as often as desired on any particular call provided the associated control circuit detects a ringing signal.

Broadcast Mode

In the broadcast mode of operation a calling subscriber addresses a plurality of called h.f. stations simultaneously. The connection between the calling station and selector switch 5 is established in substantially the same manner as previously described under the heading "Call Origination." However, in this instance the calling subscriber dials a special broadcast code which will cause ringing voltage to be applied simultaneously to two or more R-leads including lead RO to common circuit 4. For illustrative purposes, we have grouped key station 8 and 9 together such that a single broadcast code will enable hands-free equipment at both stations. Referring now to FIG. 4 and to ringing selector switch 17, contact RS-11 operates to connect ringing supply voltage to leads R2 and R3, both of which may be traced to hands-free control circuits 2 and 3, respectively. In FIG. 4 these paths include diodes CR9 and CR10 which are furnished to prevent ringing signals from activating transistor Q5 inadvertently on single station calls to the grouped stations. The ringing signal on leads R3 and R4 is also applied via lead RO to activate transistor Q5 shown at the lower left of FIG. 3. The latter transistor furnishes base drive current for PNPN transistor Q4. Transistor Q4 is a memory element associated with the broadcast mode operation. Each of the control circuits 2 and 3 respond as previously described to the presence of a ringing signal on lead R2 and R3 by operating relays 2C2 and 2C3, respectively, to connect the loudspeaker and microphone assemblies of those stations via voice control circuit 6 to the comomon battery feed circuit 15. Also, as previously described, the operation of these relays grounds lead WI to operate relay 3I preparatory to generating a warning tone concurrently at the two called stations.

With reference once again to FIG. 3, relay 3BC operates when PNPN transistor Q4 is conductive and relays 3W and 3H are operated. Specifically, transistor Q6 turns on when contact 3I-2 operates and furnishes base drive voltage via resistor R36 and diode CR5. In turn, sufficient current is now available to operate relay 3BC via the emitters of transistor Q4 which couples battery on lead H to one side of the winding of relay 3BC and via the collector-emitter junction of transistor Q6 which connects ground to the opposite winding. Battery is furnished to lead H via contact 3H-2 and contact 3W-1 in parallel with transistor contacts 3BC-1. Lead H is also the holding circuit for the memory elements (transistor Q2) in hands-free control circuits 2 and 3. This path is significantly altered when relay 3BC operates preparatory to inhibiting h.f. operations entirely in the event two or more of the called key stations engae their conventional handsets to converse with the calling party. The contact which effects this change is transfer contact 3BC-1. This latter transfer contact is an early-break-make configuration (noncontinuity transfer) which means that momentarily battery is disconnected from the H lead when these contacts are operated or released at a time when relay 3W is non-operated. During the time that relay 3BC is operating, the presence of contacts 3BC-1 in the operating path do not serve a useful function. Accordingly, it is necessary to furnish a bypass path around contact 3BC-1 to maintain battery on lead H. Contact 3W-1 performs this function. It will be recalled that relay 3W operates for approximately one second to control the generation of the warning tone. During the time relay contact 3BC-1 is operating, relay contact 3W-1 is closed to provide a sufficient period to mask the open period created by the operation of contact 3BC-1.

So long as the key station subscribers at station 8 and 9 in the present example remain in the hands-free mode, the calling station may transmit to both called stations simultaneously. If one key station of the two called stations 8 and 9 goes off-hook using conventional station equipment, the h.f. equipment at the off-hook station is disabled in much the same manner as previously described under the heading "Transferring from a Hands-Free Mode to Conventional Mode." Importantly, this action by one of the called key stations also disables the hands-free mode at both called stations because the memory PNPNs are turned off. Neither called station can reuse the h.f. equipment. Specifically, whenever the station goes off-hook, the voltage on the lead designated D1 shown in FIG. 4 goes slightly negative due to the current drain of the additional station connection on battery feed circuit 15. This voltage step is sensed by transistor Q7 (FIG. 3) via lead D1 and it momentarily turns on. As a result, the voltage across diode CR5 falls below its threshold level and transistor Q6 turns off releasing relay 3BC. Importantly, transfer contact 3BC-1, which supplied battery on the H lead, releases providing a momentary open on the H lead. This open period is sufficient to render the PNPN memory devices of control circuit 2 and 3 nonconductive. Accordingly, the hands-free mode is entirely disabled.

What is claimed is:

1. A station control arrangement for a loudspeaker-microphone assembly to automatically engage an incoming call connection in response to the receipt of ringing signals at a called station comprising means responsive to the detection of said signals for generating an enabling signal, means operative for connecting said assembly to the call connection associated with said ringing signals, a semiconductor switching device activated by said enabling signal for connecting a first portion of an operating circuit path to said connecting means, means under control of the called station for establishing a remainder portion of said operating circuit path to operate said connecting means, and means for holding said switching device in an activated state for the duration of said call connection.

2. The invention recited in claim 1 further including a telephone set having switchhook contacts whose operative state indicate the off-hook and on-hook status of said set, and said contacts being connected to said establishing means for releasing said connecting means when the switchhook status is off-hook.

3. The invention recited in claim 2 wherein said establishing means comprises a transistor switching element having a collector, base and emitter, said collector being in series connection with said connecting means, said emitter being connected to ground, and said transistor base being connected to said swithhook contacts which control the conductive state of said element and thereby the remainder portion of said operating circuit path.

4. The invention set forth in claim 1 further including a warning tone generator capable of producing a distinctive audible signal via said assembly, and means under control of said connecting means for connecting said generator to said call connection for a predetermined period following the operation of said connecting means.

5. The invention set forth in claim 1 wherein said switching device is a PNPN transistor device having a base electrode for activating said device and two emitter electrodes having a low impedance path therebetween when said device is activated, said first portion of said circuit path comprising said emitter electrodes one of which connects to said connecting means and the other one of which connects to said holding means, and said base electrode is connected to said generating means.

6. The invention set forth in claim 1 further including a common circuit comprising means for controlling the connection of a plurality of speaker-microphone assemblies to said call connection, individual telephone sets associated with each one of said assemblies being connectable to said call connection, means for determining a connection of at least two of said telephone sets to said call connection, and means controlled by said determining means for de-activating said switching device when at least two sets are connected to said call connection.

7. The invention set forth in claim 6 wherein said deactivating means is connected in series relation with said holding means, and includes devices for momentarily opening a first portion of said operating circuit path.

8. In a communication arrangement, a plurality of key stations each including a telephone set and a hands-free communicating assembly which incorporates a microphone and loudspeaker, a dial selective intercom system connected to each of said stations having a common transmission path for interconnecting said stations, said system including a station signaling circuit responsive to dialed digits for selectively alerting any one of said stations to a call connection, a control circuit associated with each station being responsive to said signaling circuit for connecting a communicating assembly at a called on of said stations to said transmission path, said control circuit being characterized by a semiconductor switching device activated by said signaling circuit and maintained in an activated state by the supervisory state of a calling one of said stations, and said device is effective to de-activate said assembly when the set at the called station is off-hook and to subsequently re-activate said assembly when said set at the called station is on-hook.

9. In an intercom telephone system having an intercom cable, a station control arrangement for a station equipped with a telephone set, hands-free loudspeaker and microphone device comprising means responsive to detection of a ringing signal for generating an enabling signal, semiconductive memory switch means connected to said generating means and initially enabled by said signal, means operative exclusively when said switch means is enabled for connecting said lougspeaker and microphone device to the intercom cable, first circuit means enabled when the telephone set is on-hook both for holding said memory switch means enabled in the absence of said signal as well as for maintaining the operative state of said connecting means, and means effective when said telephone state is off-hook for rendering said connecting means inoperative while said memory switch means is held enabled.

10. An intercom telephone system having an intercom cable, a plurality of stations, at least certain of said stations including a telephone set and hands-free microphone and loudspeaker devices, a plurality of hands-free control circuits, one said control circuit being associated with each of said stations including hands-free microphone and loudspeaker devices, and a station common circuit connected to all said control circuits, each of said control circuits including means responsive to detection of a ringing signal designating the associated station for generating an enabling signal, semiconductive memory switch means connected to said generating means to be enabled by said enabling signal, means operative foor connecting the loudspeaker and microphone devices of said associated station to said intercom cable, first circuit means including second switch means enabled when the associated telephone set is on-hook for maintaining said memory switch means enabled, said first circuit means including said connecting means, and second circuit means for maintaining said memory switch means enabled when said associated telephone set is off-hook, said second circuit means being distinct from said second switch means and said connecting means; and said station common circuit including means responsive to the presence of a call on said intercom cable for connecting a further enabling signal to said semiconductive memory switch means of all of said control circuits.

11. An intercom telephone system in accordance with claim 10 wherein said station common circuit further includes second semiconductive memory switch means, means responsive to a broadcast signal for enabling said second semiconductive memory switch means, and means responsive to enabling said second semiconductive memory switch means and any station priorly in hands-free operation having its telephone set go off-hook for momentarily removing said further enabling signal from said semiconductive memory switch means of all of said control circuits.

12. An intercom telephone system in accordance with claim 11 wherein said momentary removing means includes means for detecting the off-hook status of a telephone set of a station priorly in hands-free operation, a relay connected to said second semiconductive memory switch means, means connected to said detecting means for inhibiting conduction through said relay, and contact means of said relay interrupting said further enabling signal.

* * * * *